United States Patent [19]

Kemper

[11] Patent Number: 5,893,444

[45] Date of Patent: Apr. 13, 1999

[54] SPRING ASSISTED ELECTRONICALLY ACTUATED AND CONTROLLED STARTING CLUTCH SYSTEM, AND METHOD FOR OPERATING THE SAME

[76] Inventor: Yves J. Kemper, 2626 Norwood Dr., Bloomfield Hills, Mich. 48302

[21] Appl. No.: 08/968,872

[22] Filed: Nov. 5, 1997

Related U.S. Application Data

[63] Continuation of application No. 08/739,708, Oct. 29, 1996, abandoned

[60] Provisional application No. 60/010,816, Jan. 30, 1996.

[51] Int. Cl.$^6$ .............................. F16D 13/50; F16D 13/02
[52] U.S. Cl. .......................... 192/70.27; 192/89.23; 192/90; 192/109 A
[58] Field of Search .................... 192/89.23, 70.27, 192/109 A, 35, 84.7, 90, 89.21

[56] References Cited

U.S. PATENT DOCUMENTS

| | | | |
|---|---|---|---|
| 2,072,832 | 3/1937 | Weydell | 192/90 X |
| 4,602,708 | 7/1986 | Nagano | 192/89.23 X |
| 4,648,498 | 3/1987 | Herbulot et al. | 192/90 X |
| 4,865,173 | 9/1989 | Leigh-Monstevens | 192/90 X |
| 4,949,829 | 8/1990 | Tojima et al. | 192/89.23 |
| 5,088,583 | 2/1992 | Takeuchi et al. | 192/89.23 X |
| 5,148,904 | 9/1992 | Takashi et al. | 192/70.27 X |

FOREIGN PATENT DOCUMENTS 40 02 648  8/1990  Germany .................... 192/109 A

*Primary Examiner*—Rodney H. Bonck
*Attorney, Agent, or Firm*—Finnegan, Henderson, Farabow, Garrett & Dunner, L.L.P.

[57] ABSTRACT

An automotive starting clutch having an input, including a pressure plate and a back plate, and an output disk releasably clamped by the pressure plate for rotation with the input. A control diaphragm provides a control force to vary the clamping force of the pressure plate between zero and maximum values and includes radial fingers movable axially to vary the control force. The control force of the diaphragm is counterbalanced by a Belleville spring in proportion with actuating travel of the radial fingers. By adding a single Belleville spring to an otherwise conventional clutch, it is possible to reduce considerably the control force of a conventional starting friction clutch, allowing the use of inexpensive electronically controlled actuators.

16 Claims, 6 Drawing Sheets

SPRING ASSISTED ELECTRONICALLY ACTUATED AND CONTROLLED STARTING CLUTCH SYSTEM, AND METHOD FOR OPERATING THE SAME

CROSS-REFERENCE TO RELATED APPLICATIONS

This is a continuation of U.S. application Ser. No. 08/739,708, filed Oct. 29, 1996, now abandoned and based in part on provisional application Ser. No. 60/010,816, filed Jan. 30, 1996, and upon which priority is claimed under 35 U.S.C. § 119.

BACKGROUND OF THE INVENTION

The present invention relates to automotive starting clutch actuation, and, more particularly, it concerns a spring assisted actuating system by which the control forces necessary for clutch actuation are reduced by a counter balancing force which increases with clutch control travel.

The high performance engines need clutches capable of transmitting high torques, which in turn require a relatively high control force, i.e. pedal effort.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the automotive starting clutch of the invention comprises an input including a pressure plate and a back plate and an output disk releasably clamped by the pressure plate for rotation with the input. A control diaphragm provides a control force to vary the clamping force of the pressure plate between zero and maximum values and includes radial fingers movable axially to vary the control force. The control force of the diaphragm is counterbalanced by a Belleville spring in proportion with actuating travel of the radial fingers. By adding a single Belleville spring to an otherwise conventional clutch, it is possible to reduce considerably the control force of a conventional starting friction clutch, allowing the use of inexpensive electronically controlled actuators.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION OF THE PREFERRED EMBODIMENTS

In the following detailed description, the reference numbers have three digits, the first digit identifying a particular embodiment of the invention, whereas the two other digits designate a part number of each embodiment. Identical parts in the various embodiments are designated by the same three digit reference number and parts having corresponding function in the respective embodiments are designated by the same last two digits.

Figure 1:
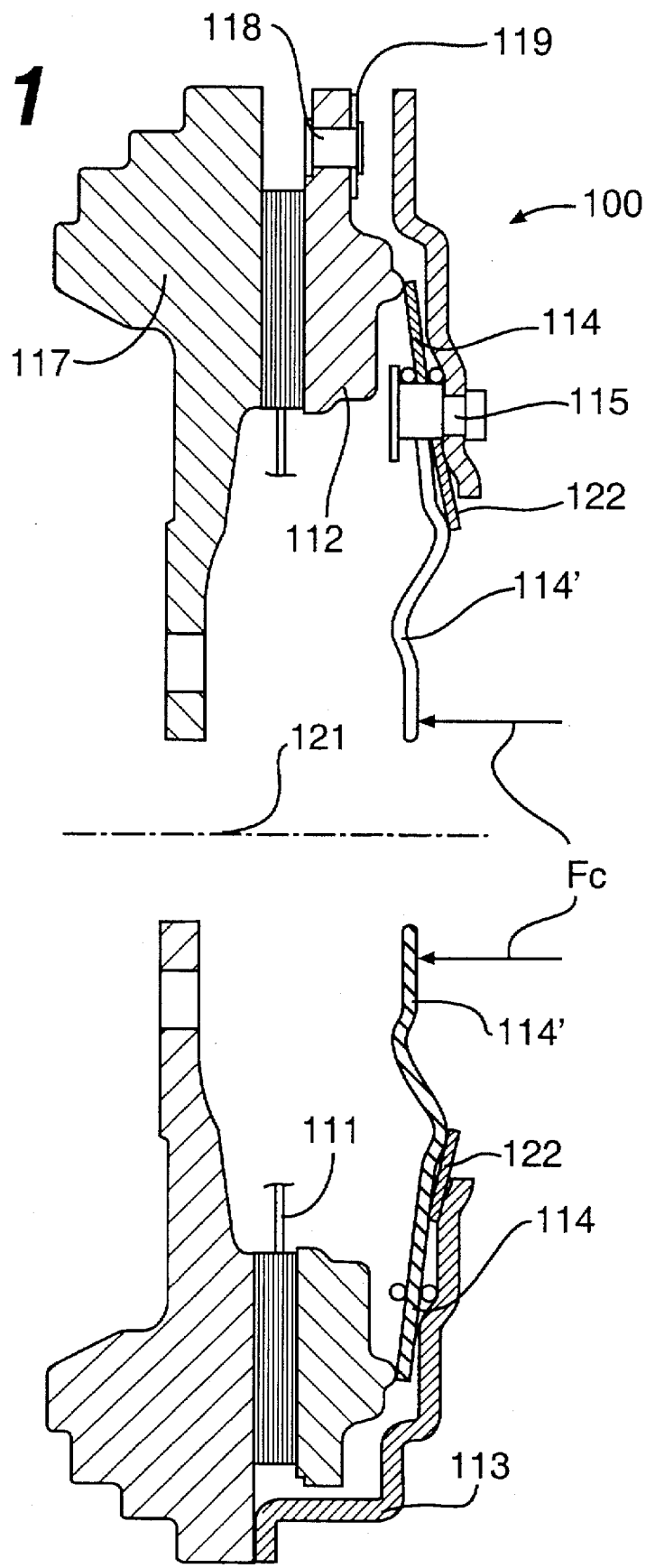
FIG. 1 is a longitudinal cross section illustrating components of a conventional automotive starting clutch equipped with the actuating system of the invention.

FIG. 1 of the drawing illustrates a starting friction clutch 100 comprising a flywheel 117 bolted or otherwise fixed for rotation about an axis 121 with an engine output (not shown), a pressure plate 112 driven in rotation by the flywheel through leaf spring elements 119, a backplate 113 fixed to the flywheel 117 by conventional means (not shown), an output friction disc 111 splined to a clutch output shaft (not shown), and a diaphragm 114 acting between the backplate 113 and the pressure plate 112. The clutch output disc carries a series of friction elements and is in the nature of a wave-form spring to form what is known in the art as "cushioning" or a "cushioning effect." The diaphragm 114 is located relative to the backplate by shouldered pins 115, and is essentially a Belleville spring with the integral, radially oriented levers 114', called "fingers." When the clutch 100 is engaged or closed, all parts shown in FIG. 1 rotate as a unit about the axis 121. When the clutch 100 is disengaged or open, only the output disc 111 ceases to rotate.

Figure 4:
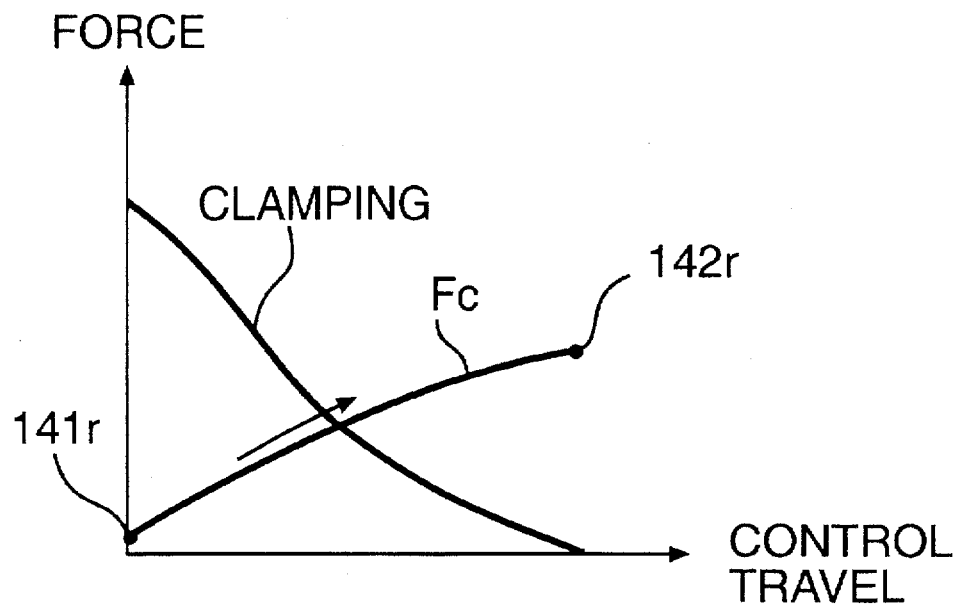
FIG. 4 is a graph illustrating control force versus control travel of a conventional automotive starting clutch diaphragm spring.

The starting clutch 100, as shown in FIG. 1, is of a type well known in the art, and, in particular, is of the push type, that is, the clamping force and consequently the torque capacity of the clutch, is controlled by applying an axial "control force" Fc, depicted in FIG. 1 of the drawings by arrows (Fc), to the inner ends of the fingers 114' toward the flywheel 117. FIG. 4 of the drawings illustrates, as a function of the travel of the inner edge of the diaphragm fingers or "control travel", the variation of the clamping force between the flywheel and the pressure plate, as well as the variation of the control force.

The control force reduction system of this invention comprises a Belleville spring 122 which is added between the backplate 113 and the fingers 114' of the diaphragm 114, such that, over the entire range of the control travel, the axial force developed by the Belleville spring 122 cancels, almost entirely, the reaction force of the fingers 114' throughout the entire range of control travel.

Figure 5:
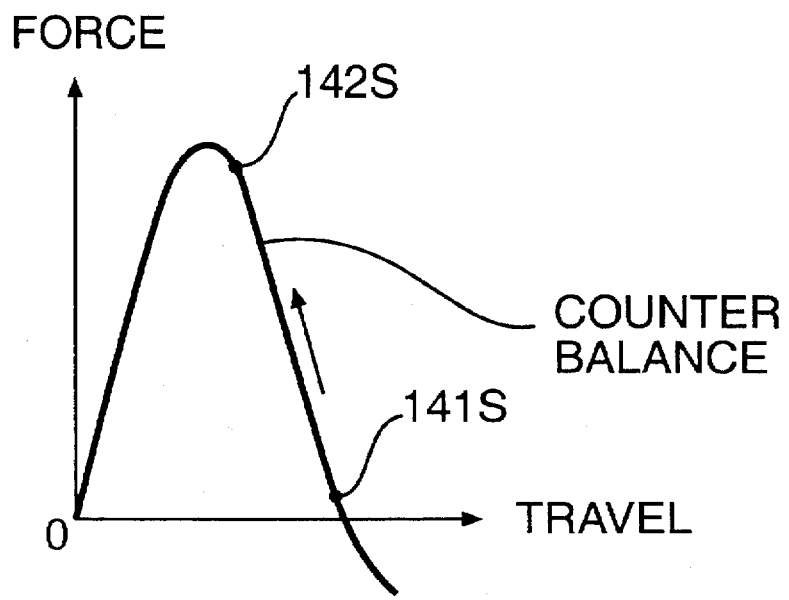
FIG. 5 is a graph showing force versus travel of a Belleville spring.

It is well known in the art that the proportions of a Belleville spring can be selected such that when it is being compressed, the force versus travel rises until it reaches a maximum and decreases thereafter. In this case, the relation between the travel and the force has approximately a bell-shaped curve as illustrated in FIG. 5 of the drawings.

FIG. 1 of the drawings illustrates the starting clutch system of the invention when its torque capacity is maximum and the control force is zero. In this case, the Belleville spring 122 is flexed to an angle such that it applies a relatively low force on the fingers 114'. This condition corresponds to the points 141r and 141s in FIGS. 4 and 5 of the drawings.

When the inner ends of the fingers 114' are moved toward the flywheel 117, as illustrated in FIG. 1 of the drawings, the clamping force between the pressure plate 112 and the flywheel 117 is reduced until the torque capacity of the clutch reaches zero, while at the same time, the fingers oppose an increasing reaction force. During the travel of the inner ends of the fingers 114', the Belleville spring 122 flexes, following the movement of the fingers 114', and as the flexing travel increases, the force it applies to the fingers increases. As depicted in FIG. 5, the Belleville spring force rises from 141s to 142s, while the reaction force of the fingers rises from 141r to 142r on the curve 1c (FIG. 4), cancelling each other to a great extent. As a result, a relatively low external control force Fc applied to the fingers 114' is sufficient to vary the clamping force of the clutch between its maximum and minimum.

The starting clutch described herein is designed such that the cushioning effect of the output disc 111 tends to move the pressure plate 112 away from the flywheel 117 as soon as the clamping force is reduced from its maximum, i.e. as soon as a force is applied to the inner ends of the diaphragm levers 114', which is the preferred setting when the clutch is operated manually by a foot pedal, for example. In the event that the maximum clamping force is higher than the axial separating force applied by the cushioning effect, which is generally the case for foot operated clutches, it is necessary to build enough flexibility into the fingers 114' of the diaphragm, such that when the inner ends of these fingers move towards the flywheel, the fingers flex, allowing the Belleville spring 122 to flex or tilt and increase the force it applies to the fingers 114', balancing in the process the reaction force of the fingers.

The clutch system described can be actuated by conventional means, including most commonly a thrust bearing sliding on a release sleeve bolted to a gearbox positioned near but outside of the backplate 113, such thrust bearing being actuated directly or indirectly by a foot operated pedal or an electronically controlled actuator.

Figure 2:
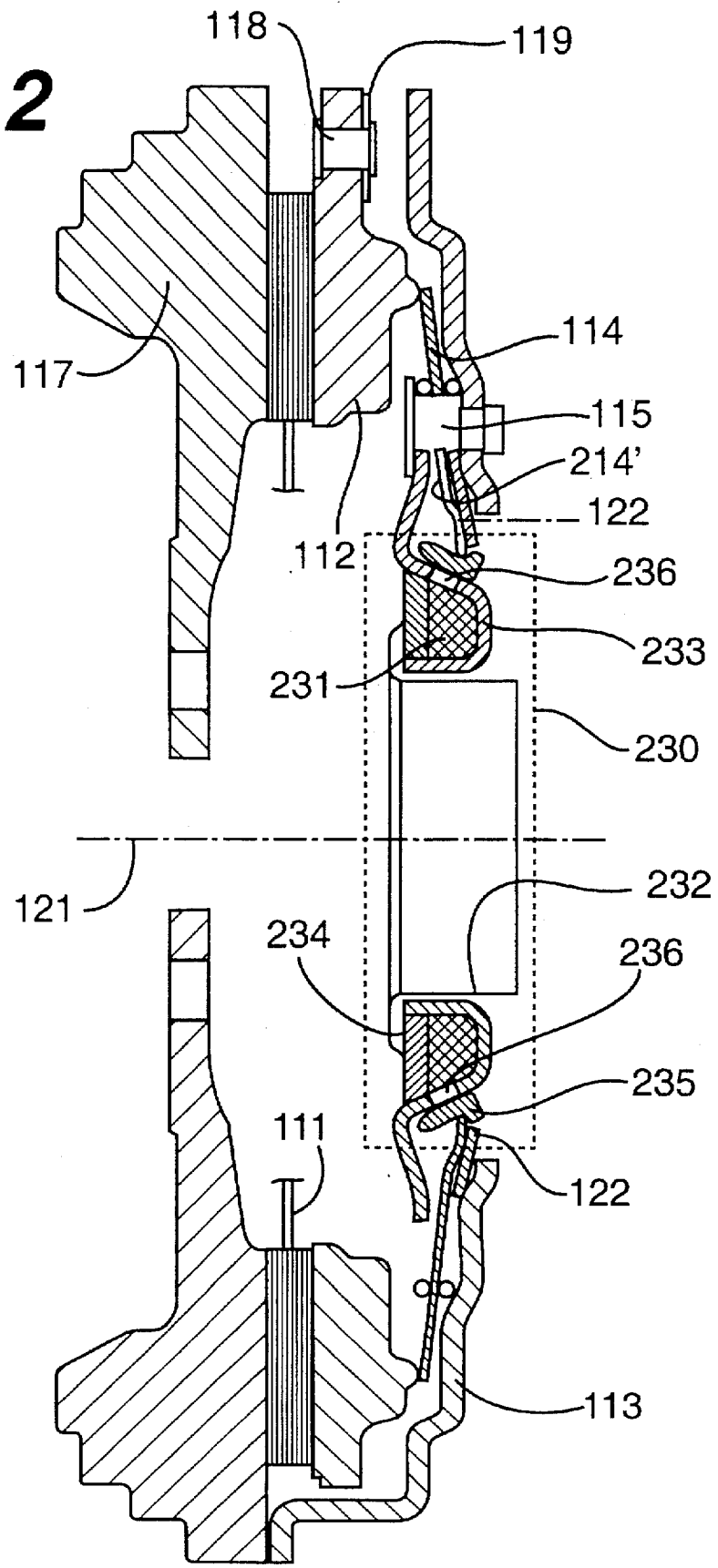
FIG. 2 is a similar view illustrating an electromagnetic actuating system of the present invention.

FIG. 2 of the drawings illustrates another embodiment of the invention, including an electronically controlled actuator taking advantage of the clutch system illustrated in FIG. 1 of the drawings. The starting clutch illustrated in FIG. 2 of the drawings is substantially the same as the one illustrated in FIG. 1, except for the length of the fingers 214'. The electromagnetic actuator is composed a breech 233 secured by adequate means to the backplate 213. This breech 233 has a series of slots 236 known in the art as "banana" slots extending circumferentially on the breech in the region facing an armature to be attracted magnetically to the breech. The inner ends of the fingers 214' cooperate with a magnetic armature 235. A stationery sub-assembly for creating a magnetic field includes a magnetic coil 231, a magnetic shield 234 and a support cup 232 held together by adequate means. The cup is retained axially, radially and against rotation relative to a gearbox housing appropriate means (not illustrated).

When electric power is supplied to the coil 231, the armature 235 is attracted magnetically towards the breech 233, moving axially the inner edge of the fingers 214'. The proportions of the system are such that the torque capacity of the clutch is reduced when the power supplied to the coil is increased, allowing full control of the torque capacity of the clutch by variation of the electric current. To accommodate for the relatively short range of action inherent in electromagnets, the fingers 214' may be reduced in length to reduce the lever ratio and therefore its travel. Also, the inner surface of the breech may have an acute angle with the axis 121 of the clutch. Since the coil is stationary, the supply of power to the coil does not require slipping brushes.

Figure 3:
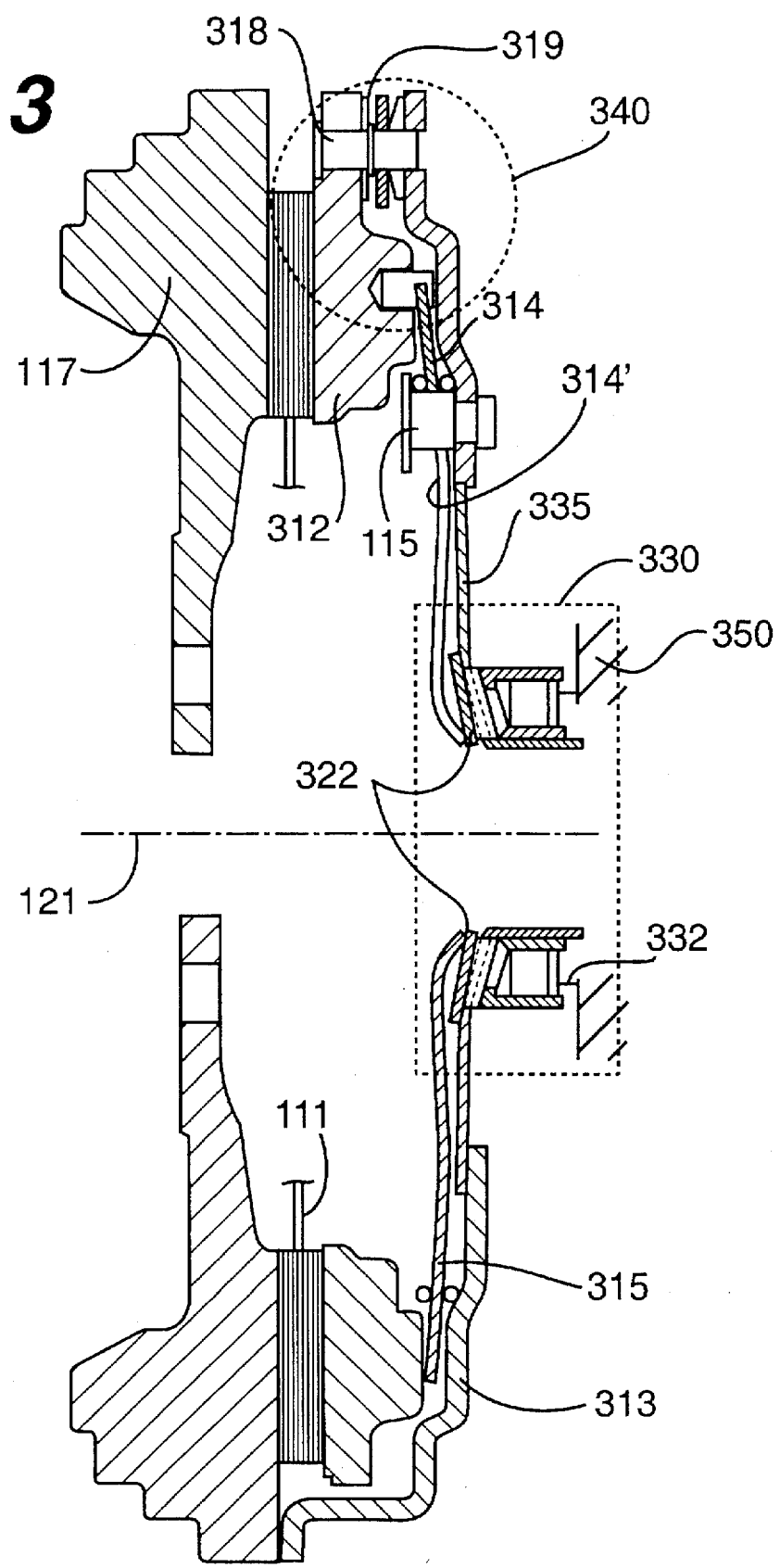
FIG. 3 is a similar cross section illustrating an alternative embodiment of the invention.
Figure 6:
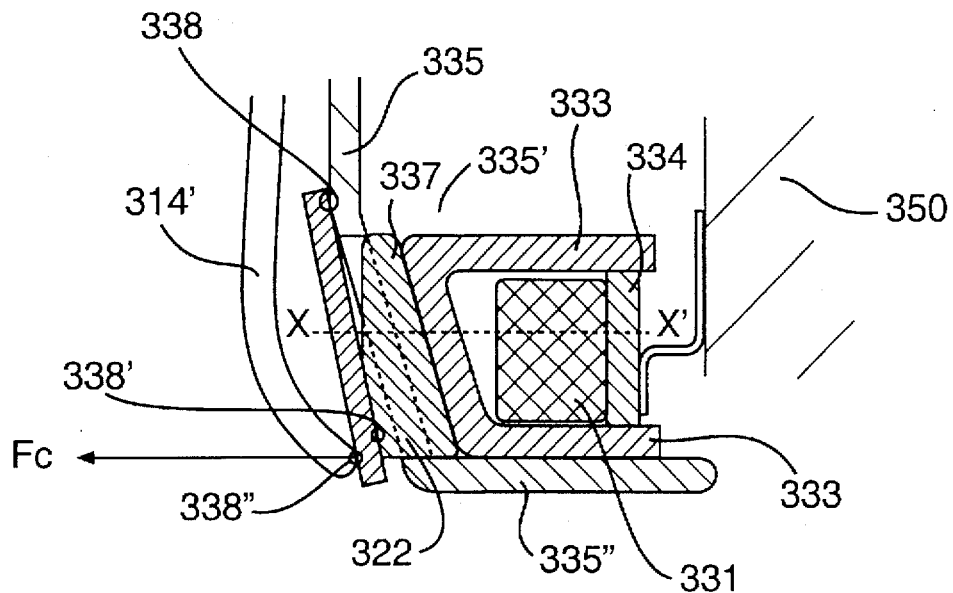
FIG. 6 is an enlarged fragmentary cross section of actuating components in the embodiment of FIG. 3 and taken on line Y-Y' of FIG. 7.
Figure 7:
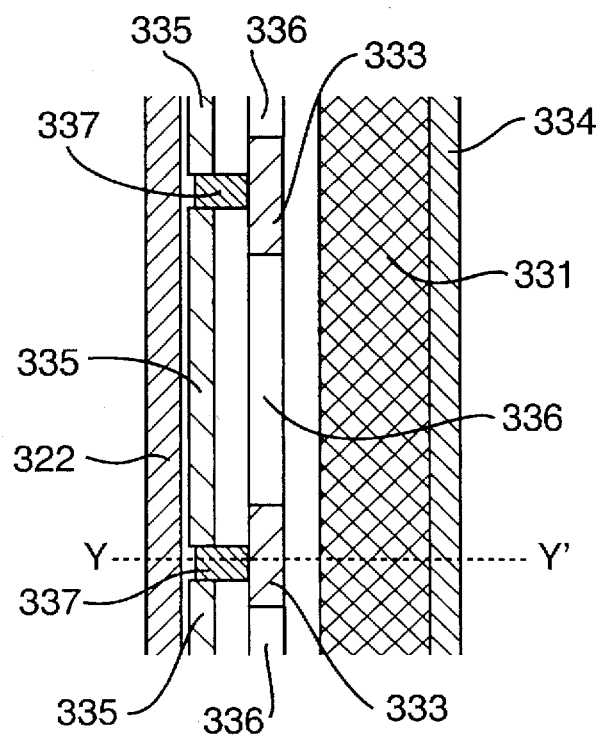
FIG. 7 is an enlarged fragmentary planar development of a cross section showing actuating components in the embodiment of FIG. 3 and taken on line X-X' of FIG. 6.

In FIG. 3, an alternative embodiment of the invention is shown in which the clamping force on the pressure plate 312 is controlled by exerting a force Fc on the inner ends of the diaphragm fingers 314', using an electromagnetic actuating mechanism 330, the details of which are shown most clearly in FIGS. 6 and 7 of the drawings. In this embodiment, the backplate 313 includes a central insert 335 of highly permeable magnetic material, which functions as an armature for the actuating mechanism 330 as will be appreciated from the description to follow. As in the previously described embodiments, the diaphragm 314 includes the inwardly directed fingers 314' counterbalanced by a Belleville spring 322. In this embodiment, the inner ends of the fingers 314', bear against the inner edge of the Belleville spring 322, whereas the outer peripheral edge of the Belleville spring is supported by the backplate insert 335.

As shown in FIG. 6, a bearing circle 338 is formed by the outer edge of a flared, frusto conical portion 335' of the insert 335. The frusto conical portion 335' extends to a cylindrical hub portion 335" of the backplate insert 335.

As shown in FIGS. 6 and 7, the flared portion 335' of the insert 335 is provided with a series of radial apertures in which cam elements 337 are movably retained for axial travel. An electromagnetic inductor including a coil 331 secured to a shield 334 and retained to a fixed housing 350 by brackets, as shown in FIG. 6, is located within a channel shaped annular breech 333 having banana slots 336 (FIG. 7) extending between face portions of the breech bearing against the cam elements 337. Although the coil 331 is fixed to be stationary by the illustrated bracket(s), the breech 333 is rotatable with the backplate insert 335 but movable axially relative to both the coil 331 and the backplate insert 335.

The cam elements 337 are each provided with an arcuate surface facing the Belleville spring 322 and shaped so that as the cam elements 337 move toward the spring, they tend to flex the Belleville spring 322 about its inner edge resting against the bearing circle 338. The point of contact between the Belleville spring 322 and the cam elements 337, however, is such that the radial arm between the bearing circle 338 and the point of contact between the spring 322 and cam elements 337 varies as the cam elements move toward the spring 322.

In operation of the embodiment as shown in FIGS. 3, 6, and 7, the inductor 331, is actuated by electric current to establish an electromagnetic field as is known in the art. The breech 333, is attracted toward the backplate insert 335, and forces the cam elements 337, into the Belleville spring 322. As a result, the diaphragm spring fingers 314' are moved axially under the force exerted by the Belleville spring 339, as controlled by a combination of the effective lever arm of a cam elements 337 and amperage of the inductor 331. Thus, starting clutch capacity is controlled by applying a force Fc on the inner ends of the fingers 314', the magnitude of the force Fc being relatively low because the reaction of the diaphragm fingers is substantially balanced by the action of the Belleville spring 322.

Figure 9:
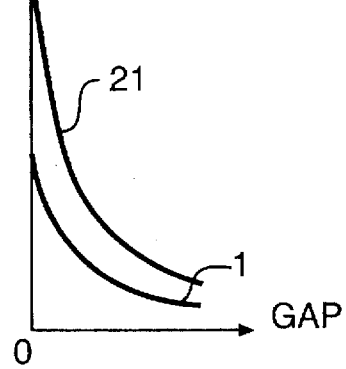
FIGS. 9 and 9A are graphs showing curves representing force vs. travel.
Figure 9A:
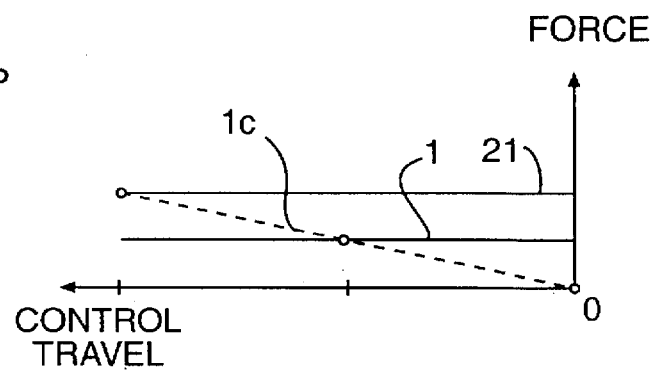

The curves 1 and 21 shown in FIG. 9 represent the force capable of being applied by the breech 333 to the cam elements 337, which force varies exponentially as a function of the magnetic gap between the breech and the backplate insert 335. The force Fc, required to move the inner ends of the diaphragm fingers increases with travel of the inner ends. The variable leverage provided by variation of the distance between points 338 and 338' in operation of the cam elements 337 enables the control force Fc exerted by the electromagnetic actuator to be substantially constant over full travel of the diaphragm fingers 314', as represented in FIG. 9A.

Figure 8:
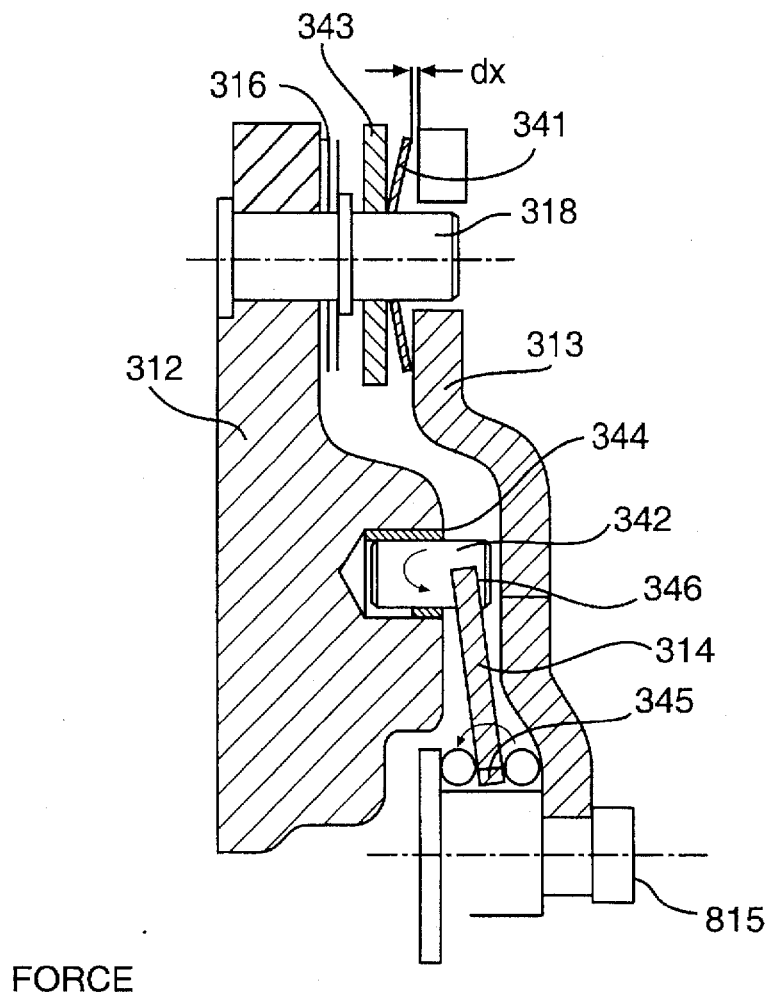
FIG. 8 is a fragmentary cross section of an embodiment incorporating a provision for wear compensation.

In FIG. 8 of the drawings, a wear compensation assembly is illustrated and which is applicable to any of the previously described starting clutch embodiments. As shown in FIG. 8, the outer end of the diaphragm 314 is secured in a slotted pin 342 extending within a bore in the back of the pressure plate 312. The pin fits with very close tolerances in the bore as a result of a bushing 344. Upon actuation of the diaphragm 314 to advance the pressure plate 312 to a close or engage the starting clutch, or to the left as shown in FIGS. 3 and 8, the pin 342 will immediately bind in the bushing 344 to effect the appropriate movement of the pressure plate 312 because the diaphragm tends to tilt the pin 342 around the point 345. On return of the pressure plate to a clutch-open condition, or to the right as shown in FIGS. 3 and 8, the pin will unbind and reposition itself in the bushing 344 toward the end of diaphragm movement to the right. Thus, upon a successive actuation of the clutch and movement of the pressure plate 312 to the left, whatever wear has occurred in the friction element of the starting clutch, will be accounted for.

Similarly, the travel of the pressure plate 312 to open the starting clutch, or to the right as shown in FIGS. 3 and 8, is controlled by a spring washer dog 341 engaged on a pin 318 and situated between a bracket plate 343 fixed against axial movement relative to the flywheel and the backplate 313. The spring washer dog 341 functions to allow relative movement between it and a pin in a leftward direction, as shown in FIGS. 3 and 8, but to anchor against the pin as it moves to the right. Thus, the distance of return movement of the pressure plate 312 will remain constant.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An automotive starting clutch having an axis of rotation and comprising:

an input including a pressure plate and a back plate;
an output disk releasably clamped by the pressure plate for rotation with the input;
a control diaphragm for exerting a control force to vary the clamping force of the pressure plate between zero and maximum values, the control diaphragm having radial fingers movable axially to vary the control force, the radial fingers having inner ends;
a Belleville spring arranged to counterbalance the control force of the diaphragm in proportion with actuating travel of the radial fingers; and
an electrically controlled actuator for moving axially the inner ends of the radial fingers, said actuator including a breech secured to the back plate, a magnetic armature cooperable with the diaphragm, and a stationary sub-assembly comprising an electromagnetic coil for magnetically attracting the armature toward the breech and providing full control of the torque capacity of the clutch by variation of electric current in the electromagnetic coil.

2. The automotive starting clutch of claim 1, wherein the inner ends of the fingers of the diaphragm cooperate with the magnetic armature.

3. The automotive starting clutch of claim 2, wherein the breech has a region facing the armature, said region having a series of slots.

4. The automotive starting clutch of claim 3, wherein the inner surface of the breech has an acute angle with the axis of the clutch.

5. The automotive starting clutch of claim 4, wherein the stationary sub-assembly further comprises a magnetic shield, and a support cup.

6. The automotive starting clutch of claim 1, further including a wear compensation assembly.

7. An automotive starting clutch comprising:

an input including a pressure plate and a back plate;
an output disk releasably clamped by the pressure plate for rotation with the input;
a control diaphragm for exerting a control force to vary the clamping force of the pressure plate between zero and maximum values, the control diaphragm having radial fingers movable axially to vary the control force;
a Belleville spring arranged to counterbalance the control force of the diaphragm in proportion with actuating travel of the radial fingers; and
an electromagnetic actuating mechanism for moving axially the inner edge of the radial fingers of the diaphragm, said actuating mechanism having a breech rotatable with the back plate, an armature cooperable with the Belleville spring and the back plate, and a stationary electromagnetic coil for attracting the breech towards the armature.

8. The automotive starting clutch of claim 7, wherein the armature is of highly permeable magnetic material.

9. The automotive starting clutch of either of claims 7 or 8, wherein the armature comprises a central insert in the back plate.

10. The automotive starting clutch of claim 9, wherein the central insert has an inner periphery defining a flared frusto-conical portion which extends to a central cylindrical hub portion.

11. The automotive starting clutch of claim 10, wherein the flared portion is provided with a series of radial apertures to receive cam elements movably retained for axial travel.

12. The automotive starting clutch of claim 11, wherein the electromagnetic coil is secured to a shield and is retained to a fixed housing to provide an electromagnetic inductor.

13. The automotive starting clutch of claim 12, wherein the breech has a channel shaped annular cross-section and wherein the electromagnetic coil and the shield are located within the breech.

14. The automotive starting clutch of claim 13, wherein the breech has slots extending between face portions of the breech bearing against the cam elements.

15. The automotive starting clutch of claim 9, wherein the inner edge of the fingers bear against an inner edge of the Belleville spring, and wherein an outer edge of the Belleville spring is supported by the central insert in the back plate.

16. The automotive starting clutch of claim 7, further including a wear compensation assembly.

* * * * *